2 Sheets--Sheet 1.

D. & C. GARVER.
Bag-Holder.

No. 161,501. Patented March 30, 1875.

WITNESSES
H. H. DuHamel
Thomas Byrne

By

INVENTOR
Daniel Garver
Cyrus Garver
H. T. Abbot
Attorney

THE GRAPHIC CO. PHOTO-LITH. 39 & 41 PARK PLACE, N.Y.

D. & C. GARVER.
Bag-Holder.
No. 161,501.
2 Sheets--Sheet 2.
Patented March 30, 1875.
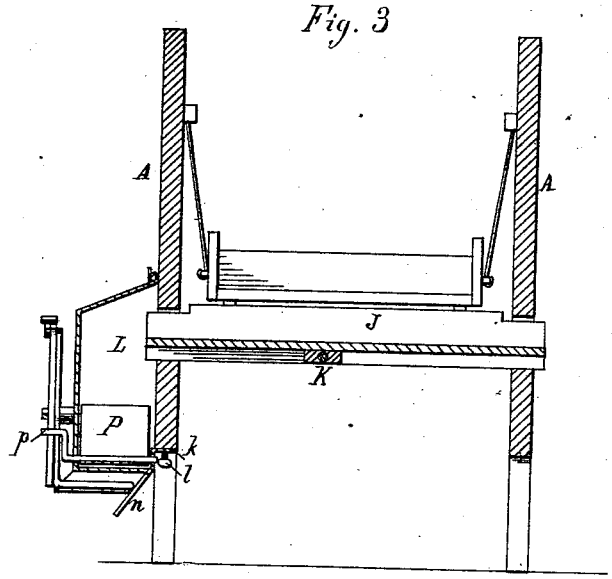
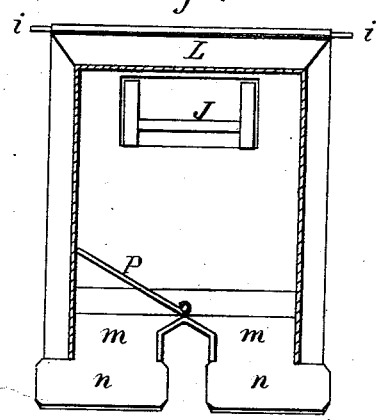
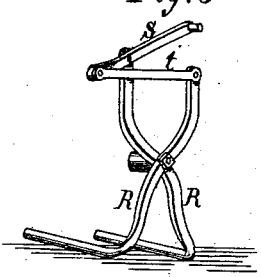
WITNESSES
W. H. Du Hamel
Thomas Byrne
INVENTORS
Daniel Garver
Cyrus Garver
Per H. T. Abbot
Attorney
By

UNITED STATES PATENT OFFICE.

DANIEL GARVER AND CYRUS GARVER, OF HAGERSTOWN, MARYLAND.

IMPROVEMENT IN BAG-HOLDERS.

Specification forming part of Letters Patent No. 161,501, dated March 30, 1875; application filed December 14, 1874.

*To all whom it may concern:*

Be it known that we, DANIEL GARVER and CYRUS GARVER, of Hagerstown, county of Washington and State of Maryland, have invented certain new and useful Improvements in Bag-Holders, of which the following is a specification:

Our invention relates to the class of bag-holders designed for attachment to grain-separators; and it consists in the construction and arrangement of the devices for holding the bags, as hereinafter more fully set forth.

In order to enable others skilled in the art to which our invention appertains to make and use the same, we will now proceed to describe its construction and operation, referring to the annexed drawings, which form a part of this specification, and in which—

Figure 1:
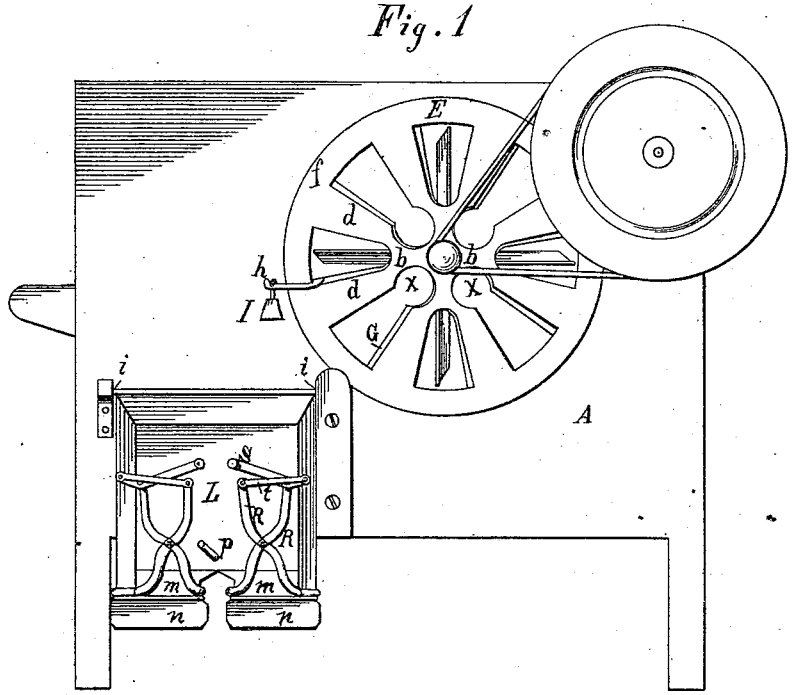
Figure 2:
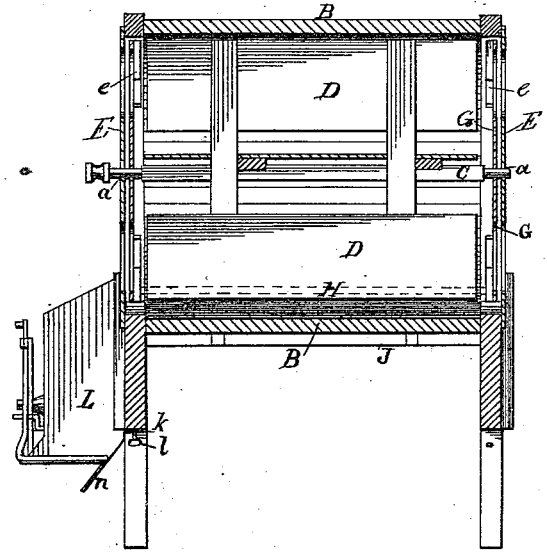

Figure 1 is a side elevation of a grain-separator embodying our invention. Fig. 2 is a transverse vertical section of the same through the fan-shaft. Fig. 3 is a similar section through the conveying-trough. Fig. 4 is a longitudinal vertical section through the discharge-box, and Fig. 5 is a perspective view of one of the bag-holding devices.

A represents the frame of a grain-separator constructed in any of the known and usual ways, and of which B is the fan-case; C, the fan-shaft; and D the fan. J represents the trough for receiving and conveying grain or seed to the discharge-box. The bottom K of this trough is pivoted or hung upon trunnions in the center, so that it can be conveniently adjusted to form an inclined plane to convey the grain or seed to either side of the machine, as desired. L represents the box receiving the grain or seed from the trough J, and may be attached to either side of the machine by means of projecting pins $i\ i$ at the upper end on both sides, which are fitted in suitable loops or bearings attached to the frame A. From the under side of the box projects an ear, $k$, through which a set-screw, $l$, is passed for securing the box to the frame of the machine. The box L is provided with two discharge-openings, $m\ m$, which are made flaring on three sides, the fourth or inner side being formed of an inclined apron, $n$, projecting below the discharge-opening. Between the two openings $m\ m$, within the box L, is pivoted a valve, P, which may be thrown to either side to close one opening and form an inclined plane for directing the grain or seed through the other opening. This valve is turned from the outside of the box by means of a handle, $p$. Above the center of each opening $m$, on the outside of the box L, are two levers, R R, crossed and pivoted at or near their centers, the lower ends of which are bent inward at right angles, and extend one on each side of the flaring opening. To the upper end of one of the levers R is pivoted a lever, S, the lower or shorter end of which is, by a rod, $t$, connected with the upper end of the other lever R.

It will be seen that, by throwing the lever S outward, the lower ends of the levers R R are thrown away from the flaring mouth, when the bag may be drawn over said mouth and apron $n$. By now throwing the lever S inward the lower ends of the levers R R are thrown against the flaring mouth, holding the bag firmly thereon. When one bag is filled the valve P is turned to fill the other bag, the filled bag taken off and an empty bag put on to be ready when the second bag is full, and so on.

Having thus fully described our invention, what we claim as new, and desire to secure by Letters Patent, is—

The combination, with the discharge-box L, of the bag-holding devices consisting of the angular levers R R, crossed and pivoted at or near their centers, lever S, and connecting-rod $t$, all constructed substantially as and for the purposes herein set forth.

In testimony that we claim the foregoing as our invention we hereunto affix our signatures this 9th day of December, 1874.

DANIEL GARVER.
CYRUS GARVER.

Witnesses:
W. K. DUHAMEL,
THOMAS BYRNE.